United States Patent [19]
Kaneko et al.
[11] Patent Number: 4,906,072
[45] Date of Patent: Mar. 6, 1990

[54] DISPLAY APPARATUS AND DRIVING METHOD FOR PROVIDING AN UNIFORM POTENTIAL TO THE ELECTRODES

[75] Inventors: Shuzo Kaneko; Tohru Takahashi, both of Tokyo, Japan

[73] Assignee: Canon Kabushiki Kaisha, Tokyo, Japan

[21] Appl. No.: 105,012

[22] Filed: Oct. 6, 1987

[30] Foreign Application Priority Data

Oct. 9, 1986 [JP] Japan ................................ 61-239254
Oct. 9, 1986 [JP] Japan ................................ 61-239255

[51] Int. Cl.[4] ............................................. G02F 1/133
[52] U.S. Cl. ............................... 350/333; 350/350 S; 350/336
[58] Field of Search ............ 350/332, 336, 334, 350 S, 350/331 R, 339 R; 357/51; 340/784, 765, 811

[56] References Cited

U.S. PATENT DOCUMENTS 3,834,794 3/1974 Soref .................................. 350/336
3,979,743 9/1976 Moose ................................ 350/336
4,112,361 9/1978 Nakada et al. ...................... 350/336
4,139,278 2/1979 Matsumoto et al. ................ 350/332
4,365,868 12/1982 Richardson ......................... 350/336
4,427,997 1/1984 Hareng et al. ...................... 350/336
4,493,531 1/1985 Bohmer et al. ...................... 350/336
4,639,089 1/1987 Okada et al. .................... 350/350 S
4,747,671 5/1988 Takahashi et al. .............. 350/350 S
4,763,994 8/1988 Kaneko et al. .................. 350/350 S
4,776,676 10/1988 Inoue et al. ..................... 350/350 S
4,818,078 4/1989 Mouri et al. ..................... 350/350 S

FOREIGN PATENT DOCUMENTS 0059424 3/1986 Japan .................................. 350/333
2100017 12/1982 United Kingdom ................ 350/336

OTHER PUBLICATIONS

D. H. Johnson et al., "Laser Diode Liquid Crystal Video Display" IBM-Technical Disclosure Bulletin-vol. 19-No. 6, Nov. 1976-pp. 2342-2343.

*Primary Examiner*—Stanley D. Miller
*Assistant Examiner*—Tai V. Duong
*Attorney, Agent, or Firm*—Fitzpatrick, Cella, Harper & Scinto

[57] ABSTRACT

A driving apparatus suitable as, e.g., an electrode plate for an optical modulation device such as a liquid crystal device, comprises a conductor film, a plurality of voltage supply lines electrically connected to the conductor film respectively by the medium of a resistor, means for simultaneously applying a voltage signal to at least two voltage supply lines among the plurality of voltage supply lines, and means for changing a potential level provided to the conductor film defined between the at least two voltage supply lines.

35 Claims, 10 Drawing Sheets

DISPLAY APPARATUS AND DRIVING METHOD FOR PROVIDING AN UNIFORM POTENTIAL TO THE ELECTRODES

FIELD OF THE INVENTION AND RELATED ART

The present invention relates to potential provision to an electrode and particularly to a driving apparatus for various modulation means inclusive of optical modulation devices such as liquid crystal display and electroluminescent display or those utilizing electric fields.

FIG. 16 schematically shows an ordinary electrode arrangement for use in a conventional optical modulation device including, as a specific example, one for a liquid crystal display device using a TN (twisted nematic) liquid crystal or a ferroelectric liquid crystal. As shown in FIG. 16, scanning electrodes 161 and data electrodes 162 are connected through signal supply lines 166 to drivers 165 where potentials are supplied to the respective electrodes depending on signals from a scanning electrode drive unit 163 and a data electrode drive unit 164. As a result, an electric field applied to a liquid crystal sandwiched between electrodes is controlled.

Individual electrodes among the scanning electrodes 161 and the data electrodes 162 are structurally independent from each other, and the electrodes in each group are connected to the signal supply lines 166 at the ends on one side thereof. As a result, there arises a problem, e.g., when they are disposed in the form of vapor-deposited stripe films on a glass substrate, that the potential at a point on an electrode remote from the signal supply line 166 becomes unstable because of cutting or lacking of the stripe at an intermediate part. Further, in order to provide the electrodes respectively with desired potentials, it is necessary to use a number of drivers corresponding to the number of the respective potentials, so that each drive unit becomes expensive especially when the number of pixels (electrode intersection) and the number of potential levels to be selected is large.

SUMMARY OF THE INVENTION

In view of the above problems involved in the prior art, an object of the present invention is to provide an optical modulation device wherein each electrode can have a substantially uniform potential and the number of drivers can be remarkably decreased, and a driving apparatus therefor.

More specifically, according to the present invention, a driving apparatus is provided which comprises: a conductor film, a plurality of voltage supply lines electrically connected to the conductor film respectively by the medium of a resistor, means for simultaneously applying a voltage signal to at least two voltage supply lines among the plurality of voltage supply lines, and means for changing a potential level provided to the conductor film defined between the at least two voltage supply lines.

By disposing a plurality of conductors at a desired spacing on a conductive film or a resistive film having a low resistivity, the conductive film is partitioned into a plurality of sections or stripes. A plurality of conductors are disposed on the conductive film respectively through a resistor or dielectric material having a high resistivity so that they are provided with potentials independently from each other and each conductive film can be supplied with a potential corresponding to a combination of the potentials applied to the conductors partitioning or defining the conductive film.

DESCRIPTION OF THE PREFERRED EMBODIMENTS

Figure 1:
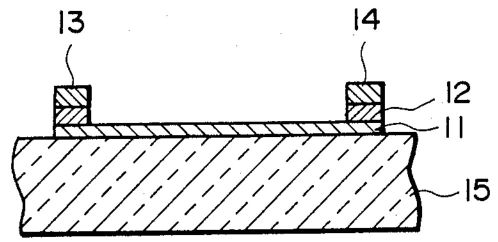
FIGS. 1 and 2 are a longitudinal sectional view and a plan view, respectively, showing a part of an embodiment of the present invention.
Figure 2:
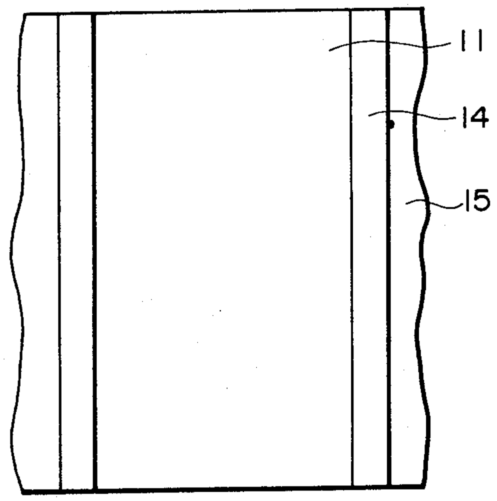

FIG. 1 is a longitudinal sectional view showing a part of an electrode structure suitable for practicing the potential provision according to the present invention, and FIG. 2 is a plan view of the electrode structure.

The electrode structure shown in these figures comprises an electrode film or surface composed of a conductor film or resistive film of a relatively low resistivity, and a plurality of conductors 13 and 14 formed on the electrode film by the medium of a resistor (resistive material or dielectric material) 12 of a relatively high resistivity.

The electrode film 11 is formed of a transparent film of ITO, $SnO_2$, $In_2O_3$,etc., or a metal film of Au, etc., on a substrate 15 of glass, etc.

The resistor or resistive member 12 comprises a resistive material or dielectric material of a relatively high resistivity and is composed of, e.g., a polyester resin containing a small quantity of electro-conductive powder, such as metal-doped Si, Se or carbon powder.

The conductors 13 and 14 are formed of Al, Au, etc., on the resistor 12 and function as voltage supply lines.

Figure 3:
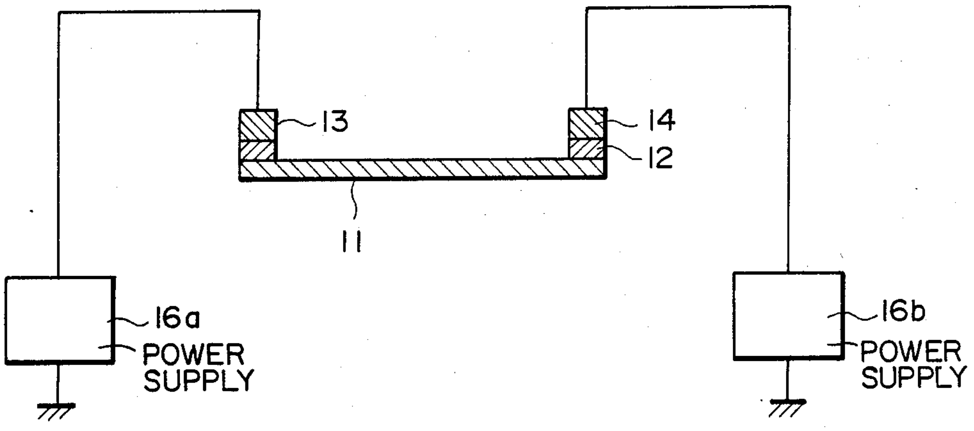
FIGS. 3 and 4 are views for explaining the principle of providing a potential according to the present invention.
Figure 4:
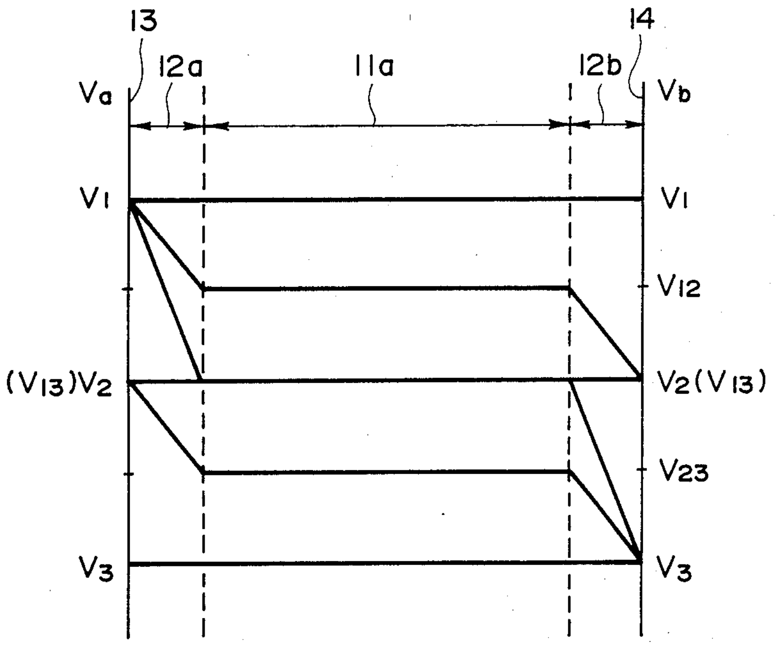

FIGS. 3 and 4 are views for explaining how a desired potential is provided to the electrode surface 11. Referring to FIG. 3, a first conductor 13 is connected to a first power supply 16*a* to be supplied with a voltage Va and a second conductor 14 is connected to a second power supply 16*b* to be supplied with a voltage Vb. For brevity of explanation, it is assumed that the voltages Va and Vb of the power supplies 16*a and 16b* respectively take three levels of $V_1$, $V_2$ and $V_3$.

The potential between the conductors 13 and 14 is determined by the combinations of applied voltages Va and Vb while it varies at resistor regions 12*a*, 12*b* and at an electrode surface region 11*a* as shown in FIG. 4. More specifically, the potential of the electrode surface 11 is determined at 5 levels, i.e., $V_1$ when Va and Vb are both $V_1$; an intermediate value $V_{12}$ when V*a* and V*b* are $V_1$ and $V_2$; an intermediate value $V_{13}$ ($V_2$) when Va and Vb are $V_1$ and $V_3$; $V_2$ when V*a* and Vb are both $V_2$; an intermediate value $V_{23}$ when Va and Vb are $V_2$ and $V_3$; and $V_3$ when Va and Vb are both $V_3$.

Hereinbelow, conditions required to establish substantially a uniform or constant potential over the entire region of the electrode surface 11 are explained.

Figure 5:
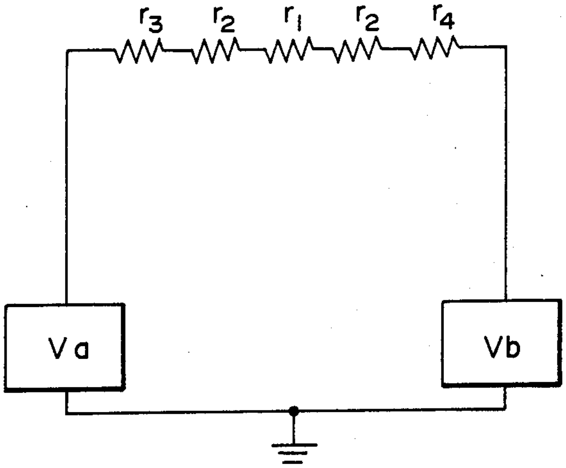
FIG. 5 is an equivalent circuit diagram of an embodiment of electrode structure according to the present invention.

FIG. 5 shows an equivalent circuit of the electrode arrangement shown in FIG. 3. Now, one of the required conditions is that the resistance $r_2$ of the resistor 12 is sufficiently larger than the resistance $r_1$ of the electrode film 11. By satisfying this condition, it is possible to establish a constant potential over the electrode surface 11 by causing a large voltage decrease due to the resistor 12 and minimizing the voltage decrease along the electrode film 11.

Figure 6:
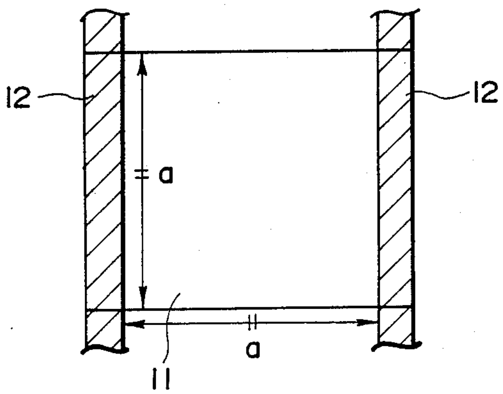
FIG. 6 is a partial plan view of an electrode surface.

The relationsip in resistance value is more specifically explained. For example, in a case as shown in FIG. 6 of a plan view wherein the electrode film 11 has a width a between the resistors 12 and has a sheet resistivity of about 100 Ω/sq., it is desired that the resistor disposed between the electrode film 11 and the conductor 13 or 14 has a resistance of not lower than $10^4$ Ω along the length a. A Joule's heat is generated in the resistor 12 due to a current therethrough, and it is desired that the resistance $r_2$ is appropriately large also for the purpose of minimizing the Joule's heat. For this reason, it is suitable that the resistor 12 comprises a semiconductor having a high withstand voltage or a substance having a higher resistivity than that.

It is then required for the conductor 13 or 14 to have a sufficiently low resistivity. For this purpose, the conductor 13 or 14 should be a metal having a particularly low resistivity among others, e.g., one showing a sheet resistivity of several tens Ω/sq. or below.

By satisfying the above conditions, it is possible to provide the electrode surface 11 with a stable and constant potential. Particularly, a stable potential is provided even to a part remote from the signal supply side of the electrode film 11 in the form of a thin stripe film from the conductor 13 or 14, so that the potential is not unstabilized even when a part of the electrode film is broken.

Figure 7:
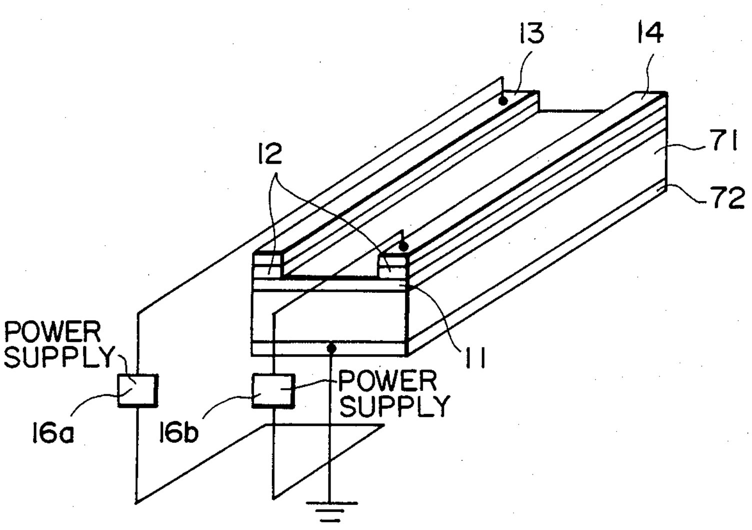
FIG. 7 is a schematic perspective view of an application embodiment of the present invention.

If the signal supply ends to the conductors 13 and 14 are disposed on the mutually opposite sides as shown in FIG. 7, the above effect is enhanced. More specifically, FIG. 7 is a perspective view showing an embodiment of application of the present invention which provides a modulation means comprising an electrode structure suitable for optical modulation devices such as those using liquid crystal and electroluminescence, and other modulation means based on an electric field effect. A modulation device shown in FIG. 7 comprises a modulation material 71 which shows an optical or other modulation effect based an electric field effect and a counter electrode 72 which is disposed opposite to an electrode structure (11, 12, 13 and 14) according to the invention by the medium of the modulation material 71. The modulation material 71 is subjected to various modulation due to an electric field formed between the electrode structure (11–14) according to the present invention and the counter electrode 72. In order to perform the modulation effectively, it is desired to make the resistance of the resistive member 12 smaller than the resistance of the modulation material 71 between the electrodes so as to apply the modulation material with a sufficiently large voltage fraction. Further, it is desired to select a resistance providing a product thereof with the capacitance of the modulation material 71 between the electrodes, i.e., time constant, which is shorter than the desired cycle of modulation response, so as to effect various modulation smoothly.

Figure 8:
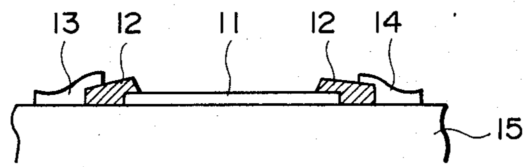
FIG. 8 is a partial longitudinal sectional view of another embodiment of electrode arrangement according to the present invention.

The electrode structure of the present invention can assume a structure as shown in FIG. 8 wherein a resistor 12 and a conductor 13 or 14 are disposed in mutual displacement from each other.

Figure 9:
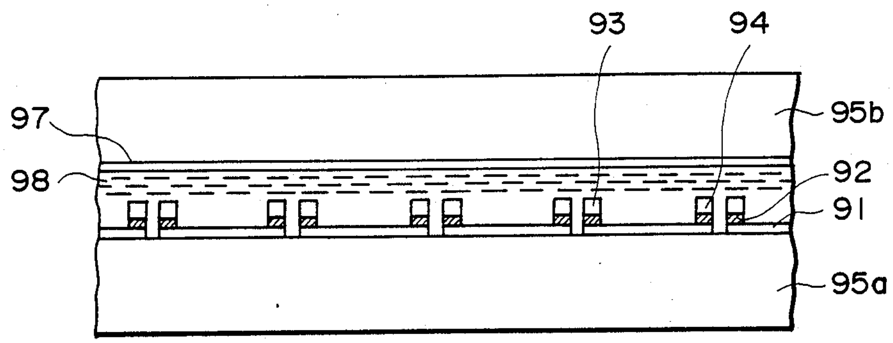
FIGS. 9 and 10 are a longitudinal view and a plan view, respectively, showing a part of another embodiment of the present invention.
Figure 10:
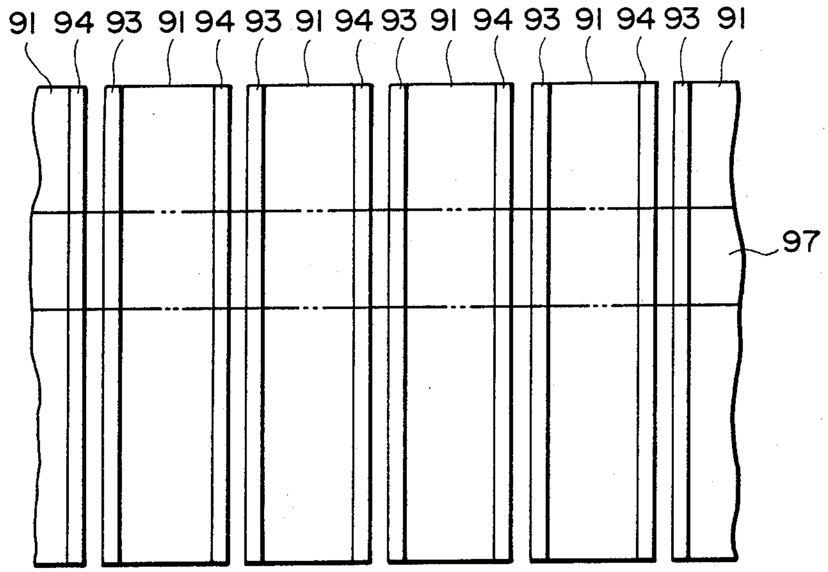

FIG. 9 is a longitudinal sectional view showing a part of a matrix electrode structure of an optical modulation device constituting an embodiment of the present invention, and FIG. 10 is a plan view of the matrix structure.

The electrode structure shown in FIGS. 9 and 10 comprises on a substrate 95*a* first electrodes 91 formed of a conductor film or resistive film of a relatively low resistivity and further thereon a plurality of conductors 93 and 94 functioning as voltage supply lines by the medium of resistors (or dielectrics) 12 of a relatively high resistivity. On the other hand, opposite the substrate 95*a*, second electrodes (counter electrodes) 97 in the form of stripes are disposed on a substrate 97, and a modulation material 98 is disposed between the substrates 95*a* and 95*b*.

The first electrodes 91 and the second electrodes 97 are formed as transparent films of ITO, $SnO_2$, $In_2O_3$, etc. or metal films of Au, etc., on the substrates 95*a* and 95*b*, respectively.

The resistive member or material 92 comprises a resistor (or dielectric material) of a relatively high resistivity and is composed of, e.g., a polyester resin containing a small quantity of electro-conductive powder, such as metal-doped Si, Se or carbon powder.

The conductors 93 and 94 are formed of Al, Au, etc., on the resistor 92 and function as voltage supply lines.

Hereinbelow, a driving apparatus for an optical modulation device using a ferroelectric liquid crystal as a modulation material 98 shown in FIG. 9 is explained.

Figure 11A:
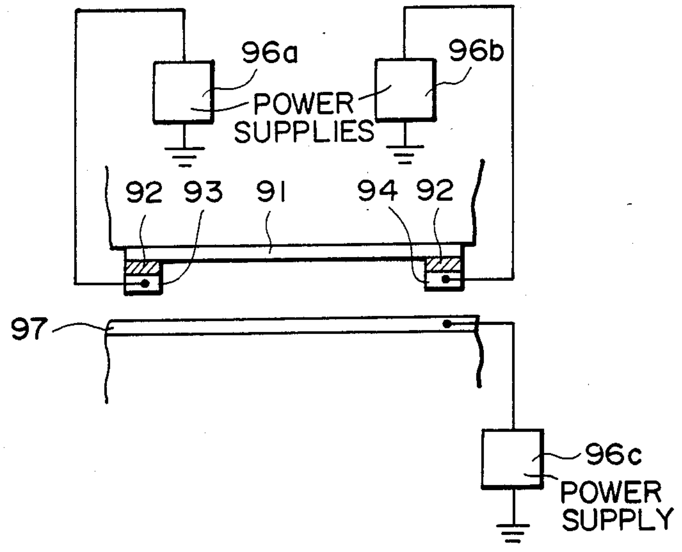
FIG. 11A is an electrode wiring diagram and FIG. 11B is a potential diagram.
Figure 11B:
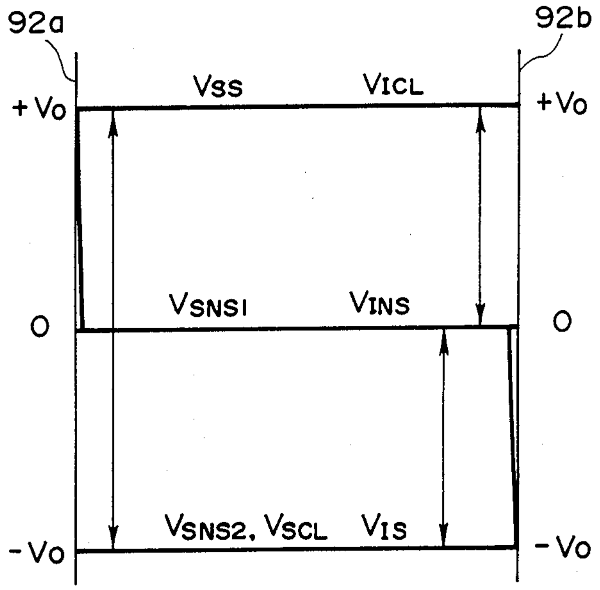

FIG. 11A schematically shows wiring to electrodes and FIG. 11B shows a potential distribution along the resistive members 92*a* and 92*b*. Now, if an inversion threshold voltage of ferroelectric liquid crystal is denoted by $V_{th}$, a magnitude of voltage $V_0$ applied to the first electrodes is set to satisfy the relation of:

$$|\pm V_0| < |\pm V_{th}| < |\pm 2V_0|.$$

When such a voltage relation is set, a molecule of the ferroelectric liquid crystal disposed between a first electrode 91 and a second electrode 97 does not cause inversion when the magnitude (absolute value) of a voltage applied between the electrodes is $V_0$ or less but is inverted corresponding to the direction of an applied voltage when the magnitude of the voltage is $2V_0$ or larger. In the following explanation, it is assumed that a pixel is inverted into "white" when a potential difference between the electrodes is $+2V_0$ or higher and is inverted into "black" when the potential difference is $-2V_0$ or below.

Referring to FIGS. 11A and 11B, when the first electrode 91 is supplied with $+V_0$ as a selection potential $V_{SS}$ and the second electrode 97 is supplied with $-V_0$ as a selection potential $I_{IS}$, the potential difference between the electrodes becomes $-2V_O$ so that the pixel is inverted into "black". From this state, if the potential of the second electrode 97 is brought to a non-selection potential $V_{INS}=0$, the potential difference becomes $-V_0$ which does not exceed $V_{th}$, the pixel state is retained without causing inversion.

On the other hand, if the potential of the first electrode is set to a non-selection potential $V_{SNS1}=0$, *the potential difference is* $-V_0$ when the potential of the second electrode 97 is $V_{IS}=-V_0$ and 0 when the potential of the second electrode 97 is $V_{INS}=0$, so that the pixel state is not inverted in any case.

Further, if the potential of the first electrode 91 is set to a non-selection potential $V_{SNS2}=-V_0$, the potential difference is 0 when the potential of the second electrode 97 is $V_{IS}=-V_0$ and $+V_0$ when the second electrode potential is $V_{INS}=0$, so that the pixel state is not inverted in any case.

Figure 12:
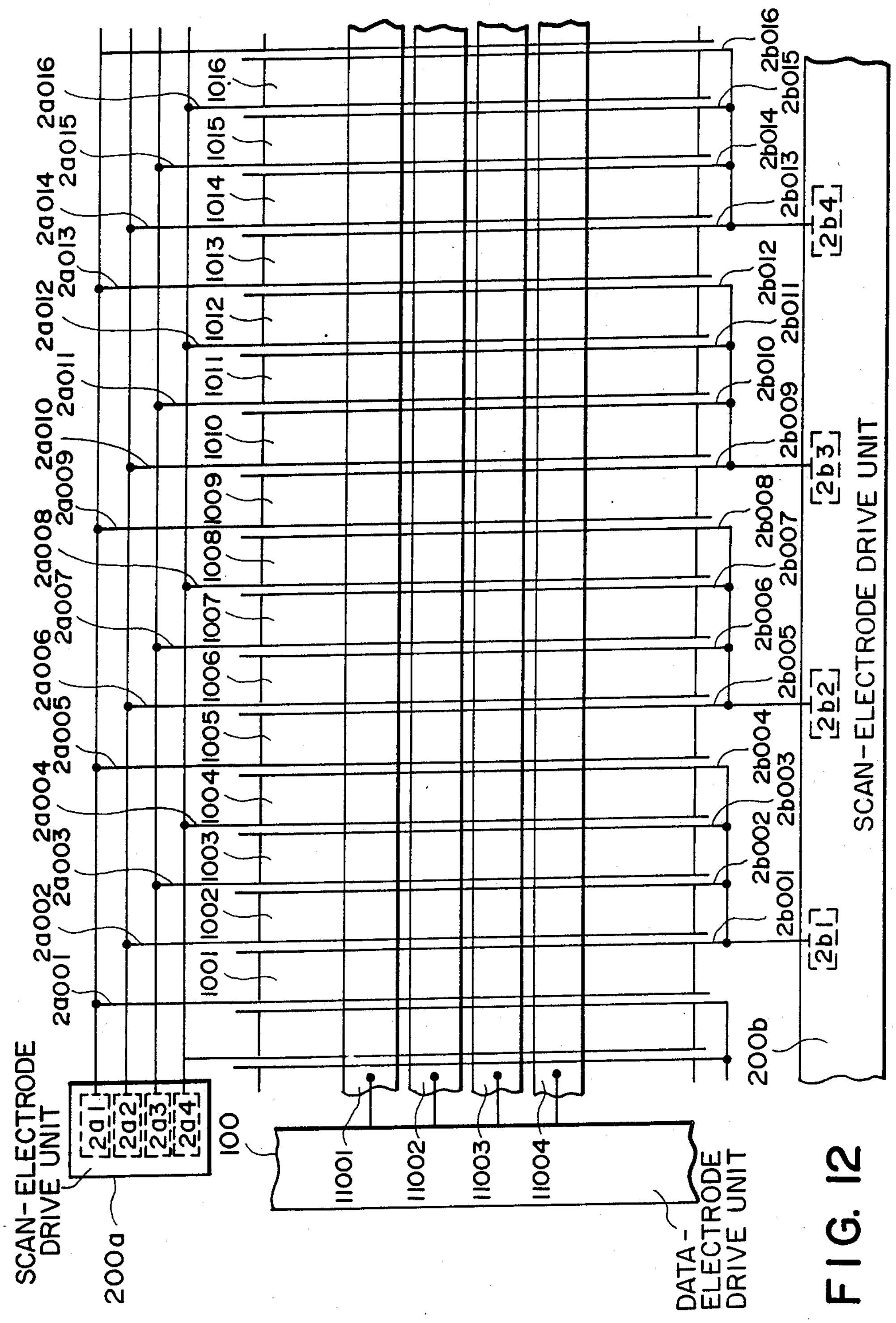
FIG. 12 is a circuit diagram of an embodiment of the present invention.

FIG. 12 shows a driving apparatus which comprises a first substrate having thereon a plurality of first conductor films each connected to first and second voltage supply lines respectively through a resistor, the plurality of first conductor films being grouped into a plurality of blocks; a second substrate having thereon second conductor films disposed opposite to the first conductor films; an optical modulation material disposed between the first and second substrates; means for commonly connecting first voltage supply lines for each block of the first conductor films; means for commonly connecting a plurality of second voltage supply lines each connected to one first conductor film among each block of the first conductor films; a first scanning signal drive unit for applying a first scanning signal to the first voltage supply lines; a second scanning signal drive unit for applying a second scanning signal to the second voltage supply lines; and a data signal drive unit for applying a data signal to the second conductor films.

More specifically, FIG. 12 is a plan view showing a circuit arrangement of an optical modulation device having a large number of pixels. Referring to FIG. 12, scanning electrodes 1001, 1002, 1003, ... correspond to the above-mentioned first electrodes 91, and data electrodes 11001, 11002, 11003 ... correspond to the above-mentioned second electrodes (counter electrodes) 97. On the scanning electrodes 1001, 1002, 1003 are disposed conductors **2*a*001, 2*a*002, 2*a*003 ... corresponding to the conductors 93 in FIG. 9 and conductors 2*b*001, 2*b*002, 2*b*003, ... corresponding to the conductors 94 in FIG. 9. While not shown in FIG. 12**, a resistor layer or dielectric layer is disposed between the respective conductors and the scanning electrodes.

A drive unit 100 for data electrodes are connected to the data electrodes 11001, 11002, 11003, ... The circuit also includes drive units **200*a* and 200*b* for scanning electrodes. The drive unit 200*a* includes drivers 2*a*1 to 2*a*4. Conductors 2*a*001, 2*a*002, 2*a*003 and 2*a*004 are connected to the drivers 2*a*1, 2*a*2, 2*a*3 and 2*a*4, respectively, and the fifth (2*a*005) and following conductors are connected in that order again to the drivers 2*a*1, 2*a*2, 2*a*3 and 2*a*4 for each four lines thereof. On the other hand, the drive unit 200*b* includes drivers 2*b*1, 2*b*2, 2*b*3, ..., and conductors 2*b*001, 2*b*002, ... forming groups each comprising four of them are connected to the drivers 2*b*1, 2*b*2**, ... respectively, in that order.

In the above electrode arrangement, the driver **2*b*1 in the drive unit 200*b* is set to a potential of $+V_0$, and the other drivers 2*b*2, 2*b*3, ... are set to a potential of $-V_0$, first of all. On the other hand, in the drive unit 200*a*, the driver 2*a*1 is set to a potential of $+V_0$, and the other drivers 2*a*2–2*a*4 are set to a potential of $-V_0$. As a result, the conductors 2*b*001–2*b*004 are set to a potential of $+V_0$ and the conductors 2*b*005–2*b*016 ... are set to $-V_0$, while the conductors 2*a*001, 2*a*005, 2*a*009, 2*a*013, ... connected to the driver 2*a*1 is set to $+V_0$, and the other conductors connected to the drivers 2*a*2–2*a*4** are provided with a potential of $-V_0$.

At this time, only the scanning electrode 1001 is supplied with a selection potential $V_{SS}=+V_0$, the scanning electrodes 1002–1004, 1005, 1009, 10013, ... 4n+1 (n: integer) ... supplied with a potential $V_{SNS1}=0$, and the other scanning electrodes are supplied with a potential $V_{SNS2}=-V_0$. In other words, a scanning electrode 1001, 1002, ... is supplied with a selection potential $V_{SS}=+V_0$ only when a pair of conductors **2*a*001 and 2*b*001, 2*a*002 and 2*b*002**, ... are both set to $+V_0$.

At this time, the data electrodes 11001, 11002, ... are supplied with data signals corresponding to a desired image, i.e., a selection potential $V_{IS}=-V_0$ or a non-selection potential $V_{INS}=0$ sequentially or simultaneously by means of the drive unit 100, whereby a line of pixels on the scanning electrode 1001 are written.

Further, the driver **2*b*1 is again set to a potential of $+V_0$ by means of the drive unit 200*b*, while simultaneously the driver 2*a*2 is set to a potential of $+V_0$ and the other drivers 2*a*1, 2*a*3 and 2*a*4 are set to a potential of $-V_0$, whereby only the scanning electrode 1002 is supplied with $V_{SS}=+V_0$. In the same manner, when only the driver 2*b*1 is set to $+V_0$, the scanning electrodes 1001–1004 are supplied with $+V_0$. Further, when the driver 2*b*2 is $+V_0$ and the other drivers 2*b*1, 2*b*3, 2*b*4, ... are $-V_0$, the drivers 2*a*1–2*a*4 are sequentially set to $+V_0$, whereby the scanning electrodes 1005–1008 are sequentially supplied with a selection potential $V_{SS}=+V_0$. By repeating the above operation, the scanning electrodes 1001–1016 ... are sequentially supplied with a selection potential $V_{SS}=+V_0$. In synchronism with the selection of each scanning electrode, the data electrodes 11001, 11002, ... are selectively supplied with either $V_{IS}$ or $V_{INS}$, by means of the drive unit 100**, whereby pixels states are determined for each line (scanning electrode).

Preceding the above image writing operation, all the pixels may be erased into a uniform state. This erasure operation may be effected simultaneously for all the lines or separately for each line prior to the writing on the line.

More specifically, the whole area may be erased simultaneously, for example, by setting all the drivers **2*a*1–2*a*4 and 2*b*1–2*b*4** ... to a potential $V_{SCL}=-V_0$ and setting all the data electrodes to a potential $V_{ICL}=+V_0$.

On the other hand, in a specific embodiment for effecting erasure line by line, prior to writing in each line, a phase is provided wherein the drivers **2*a*1–2*a*4 and the drivers 2*b*1–2*b*4 ... are respectively supplied with potentials which are respectively obtained by polarity-inversion of those applied thereto at the time of writing, and the data electrodes 11001, 11002** ... are supplied with a potential $V_{ICL}$ which is obtained by polarity-inversion of $V_{IS}$.

In the above embodiment the electrodes 1001, 1002 ... are sequentially supplied with a selection potential $V_{SS}$ as scanning electrodes. Alternatively, it is also possible to use the electrodes 11001, 11002 ... as scanning electrodes while applying data signals to the drivers **2*a*1**--

2a4 simultaneously and sequentially applying a selection signal to the drivers 2b1, 2b2 ... in time-division. More specifically, the electrode 11001 is first set to $-V_0$, and the other electrodes 11002, 11003, ... are set to 0 to select a line on the electrode 11001. At this time, the driver 2b1 is set to $+V_0$ and the other drivers 2b2, 2b3, 2b4 ... are set to $-V_0$. In synchronism therewith, the drivers 2a1–2a4 are simultaneously set to $+V_0$ when selected or $-V_0$ when non-selected. As a result, the electrodes 1001–1004 are set to a potential of $+V_0$ or 0, whereby the pixel states on the selected electrode 11001 are determined. At this time, the other electrodes 1005, 1006, ... are supplied with a potential of 0 or $-V$ providing a voltage below $V_{th}$, whereby writing is not effected thereon.

Then, the driver 2b2 is set to $+V_0$ and the other drivers 2b1, 2b3, 2b4, ... are set to $-V_0$, while the drivers 2a1–2a4 are set to $+V_0$ or $-V_0$ depending on given data. As a result, the electrodes 1005–1008 are set to a potential of $+V_0$ or 0, whereby the pixel states are determined correspondingly. In the same way, the drivers 2b3, 2b4, ... are sequentially set to $+V_0$ and the other drivers are set to $-V_0$ while in synchronism therewith the drivers 2a1–2a4 are set to $+V_0$ or $-V_0$. As a result, an image is formed on the line along the electrode 11001. Thereafter, the electrode 11002 is set to $-V_0$ and the other electrodes are set to 0 so as to write on a line along the electrode 11002.

According to the above embodiment, e.g., 16 electrode lines can be driven by 8 drivers so that the number of drivers can be remarkably decreased. More generally, according to the circuit structure shown in FIG. 12, if the drive unit 200a is provided with a number of X drivers for driving n lines, it is sufficient for the drive unit 200b to have n/X drivers, so that the total number of drivers is reduced to X +n/X. In order to minimize the total number of drivers, the number n may desirably be the square of X. For example, if the number of lines n is 1024, it is suitable that X is 32, whereby the total number of drivers is reduced to 64 (=32 +1024/32).

Figure 13:
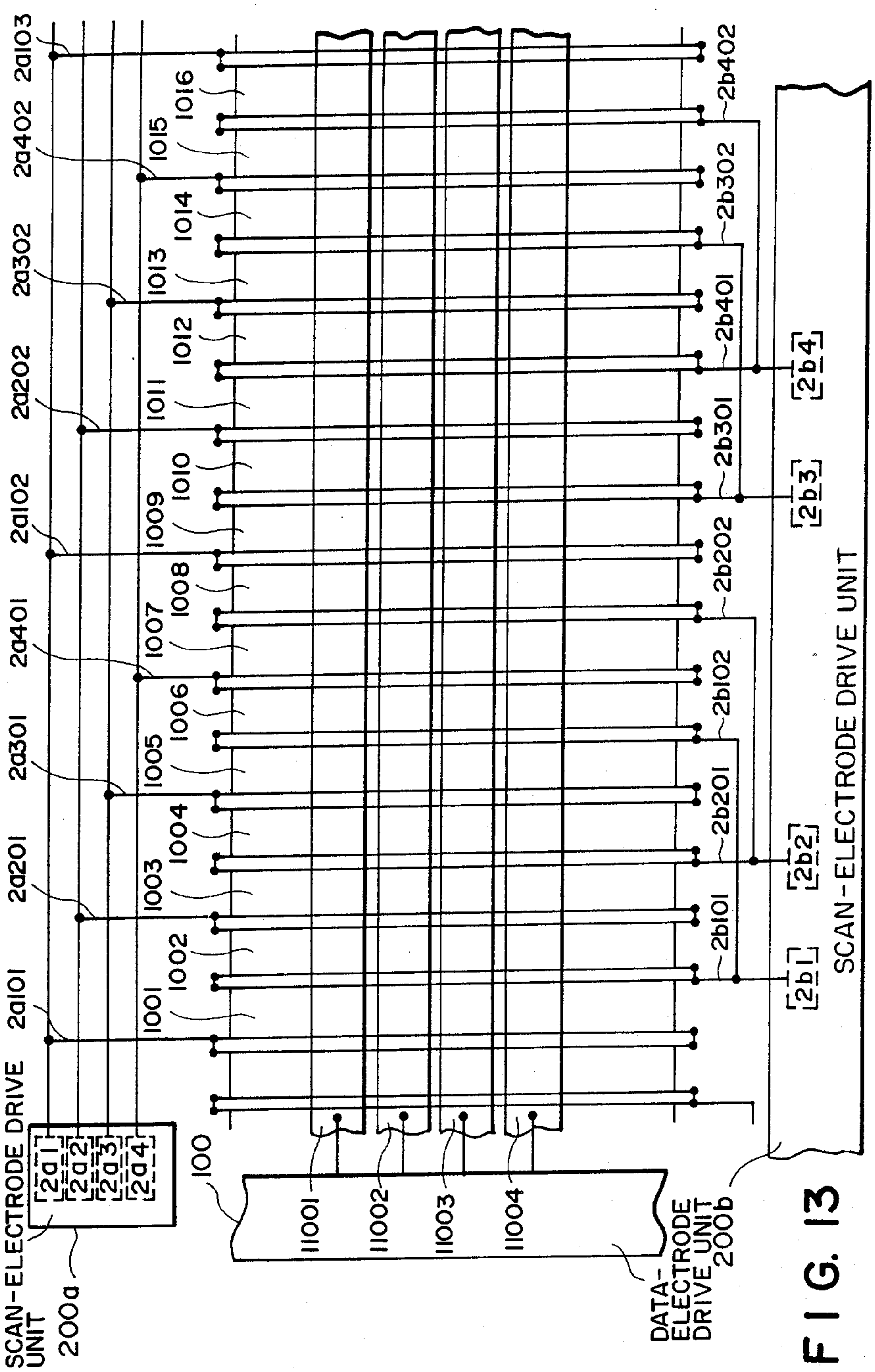
FIG. 13 is a circuit diagram of another embodiment of the present invention.

FIG. 13 shows an embodiment of the driving apparatus which comprises a first substrate having thereon a plurality of first conductor films each connected to first and second voltage supply lines respectively through a resistor; a second substrate having thereon second conductor films disposed opposite to the first conductor films; an optical modulation material disposed between the first and second substrates; means for commonly connecting the first voltage supply line and the second voltage supply line of one and the other, respectively, of an adjacent pair of the first conductor films; a first scanning signal drive unit for applying a first scanning signal to the first voltage supply lines; a second scanning signal drive unit for applying a second scanning signal to the second voltage supply lines; and a data signal drive unit for applying a data signal to the second conductor films.

In FIG. 13, the same reference numerals denote like parts as those shown in FIG. 12. Referring to FIG. 13, adjacent pairs of conductors on the electrodes 1001, 1002, ... are commonly connected respectively. Among the thus commonly connected conductors, the conductors 2a101, 2a201, 2a301, ... are connected to the drivers 2a1, 2a2, ... respectively, in that order. The fifth (2a005) and following conductors are connected in that order again to the drivers 2a1, 2a2, 2a3 and 2a4 for each four lines. On the other hand, the conductors 2b101, 2b102, ... are successively commonly connected in pairs and connected to the drivers 2b1, 2b2... in order.

Also in the electrode arrangement shown in FIG. 13, the electrodes 1001, 1002, ... are supplied with a potential of $+V_0$ only when conductors on both sides of each electrode are provided with a potential of $+V_0$. More specifically, in order to supply $+V_0$ only to the electrode 1001, the driver 2b1 is set to a potential of $+V_0$ and the other drivers 2b2–2b4 ... are set to a potential of $-V_0$ in the drive unit 200b. At this time, if the driver 2a1 is set to a potential of $+V_0$ and the other drivers 2a2–2a4 are set to a potential of $-V0$ in the drive unit 200a, only the electrode 1001 is provided with a potential of $+V_0$, the electrode 1002 is 0, the electrodes 1003 and 1004 are $-V_0$, the electrodes 1005 and 1006 are 0, 1007 is $-V_0$, 1008 and 1009 are 0, 1010–1015 are $-V_0$; 1016 is 0, and so on, whereby the potentials of the respective electrodes are determined.

Then, when only the driver 2b1 is again set to $+V_0$ and the other drivers 2b2–2b4 ... are set to $-V_0$ in the drive unit 200b while simultaneously only the driver 2a2 is set to $+V_0$ and the other drivers 2a1, 2a3 and 2a4 are set to $-V_0$ in the drive unit 200a, only the electrode 1002 is supplied with a potential of $+V_0$ and the other electrodes are provided with a potential of 0 or $-V_0$. In a similar manner, the electrodes 1003 when the drivers 2b2 and 2a2 are selected, 1004 when 2b2 and 2a3 are selected, 1005 when 2b1 and 2a3 are selected, 1006 when 2b1 and 2a4 are selected, 1007 when 2b2 and 2a4 are selected, 1008 when 2b2 and 2a1 are selected and so on, are respectively provided with selection potential $V_{SS}=+V_0$.

Similarly as in the previous embodiment, a case wherein the electrodes 11001, 11002, ... are used as data electrodes, is explained hereinbelow.

First of all, only the driver 2b1 is set to a potential of $+V_0$ and the other drivers are set to $-V_0$ in the drive unit 200b. In synchronism therewith, the drivers 2a1–2a4 are respectively set to a potential of either $+V_0$ or $-V_0$ depending on given signals, whereby only a selected electrode among the scanning electrodes 1001, 1002, 1005 and 1006 is provided with a potential of $+V_0$. Further, when only the driver 2b2 is set to $+V_0$ in the drive unit 200b and the drivers 2a1–2a4 are set to $+V_0$ or $-V_0$ depending on given signals in the drive unit 200a, only a selected electrode among the scanning electrodes 1003, 1004, 1007 and 1008 is provided with $+V_0$.

Also in the above embodiment, 16 electrode lines can be driven by 8 drivers. Further, if a number of X drivers are provided in the drive unit 200a for driving n lines, it is sufficient for the drive unit 200b to have a number of n/X ($=2\ xn/2/X$) drivers, so that the total number of the drivers is reduced to X $+n/X$ similarly as in the previous embodiment.

In the above-described embodiments, for the brevity of explanation, the conductors 93 and 94 shown in FIG. 11 has been explained to be provided with a potential of $+V_0$ or $-V_0$, the first electrodes 91 (1001, 1002, ...) to be provided with a potential of $V_{SS}=+V_0$, $V_{SNS1}=0$ or $V_{SNS2}=-V_0$, and the second electrodes 97 (11001, 11002 ...) to be provided with a potential of $V_{IS}=-V_0$ or $V_{INS}=0$. However, it is of course possible that the first electrodes 91 and the second electrodes 97 are provided with a wider variety of potentials as far as it is possible to drive an objective optical modulation device thereby. Further, in the above embodiments, it is also possible that the potential applied to the second electrodes in modulated at multi-levels or continuously between the levels of $V_{IS}$ and $V_{INS}$ and/or the potential level $V_{SS}$ applied to the first electrodes is modulated in a similar manner by modulating the potential level of the selection signal applied to the conductors 94. An image with a intermediate tone or gradation can be formed as a result.

In the above embodiments, only one side of electrodes among two sides of electrodes sandwiching an optical modulation material are driven in a matrix manner. However, the other side of electrodes can also be constructed in a similar manner so as to allow a matrix driving. In such an instance, driving may be effected, for example, by using potential levels of $V_{SS}=+V_0$, $V_{SNS1}=0$ and $V_{SNS2}=-V_0$ for one side of electrodes, and potential levels of $V_{SS}'=-V_0$, $V_{SNS1}'=0$ and $V_{SNS2}'=+V_0$.

Further, if one side of electrodes are composed to provide a potential gradient as proposed by our research group in U.S. Pat. Application Ser. No. 934,920, an optical modulation device adapted for an intermediate gradational display may be obtained.

As described hereinabove, according to the present invention, a plurality of conductors are disposed by the medium of a resistor and with a desired spacing therebetween on a conductor film constituting an electrode surface, and a conductor film between conductors is provided with a potential corresponding to a combination of potentials supplied to the conductors, whereby such a conductor film can be provided with a substantially uniform potential over the entire area defined between the conductors, and the number of power supplies required for potential modulation can be remarkably reduced.

Further, according to the present invention, the number of drivers driving respective electrodes can be remarkably reduced, so that a less expensive signal supply unit can be used for the respective signals.

As an optical modulation material used in the driving method according to the present invention, a material which shows a first optically stable state (e.g., assumed to form a "bright" state) and a second optically stable state (e.g., assumed to form a "dark" state) depending on an electric field applied thereto, i.e., one showing at least two stable states in response to an electric field, particularly a liquid crystal showing such a property, may be used.

Preferable ferroelectric liquid crystals showing bistability, which can be suitably used in the driving method according to the present invention, are chiral smectic liquid crystals having ferroelectricity, among which liquid crystals showing chiral smectic C phase (SmC*), H phase (SmH*), I phase (SmI*), F phase (SmF*) or G phase (SmG*) are suitable. These ferroelectric liquid crystals are described in, e.g., "LE JOURNAL DE PHYSIQUE LETTRE" 36 (L-69), 1975 "Ferroelectric Liquid Crystals"; "Applied Physics Letters" 36 (11) 1980, "Submicro Second Bistable Electrooptic Switching in Liquid Crystals", "Kotai Butsuri (Solid State Physics)" 16 (141 ), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxy-benzylidene-p'-amino-2-chloropropyl cinnamate (HOBACPC), 4-O-(2-methyl)-butylresorcylidene-4'-octylaniline (MBRA 8), etc.

When a device is constituted using these materials, the device may be supported with a block of copper, etc., in which a heater is embedded in order to realize a temperature condition where the liquid crystal compounds assume an SmC*, SmH*, SmI*, SmF* or SmG* phase.

Figure 14:
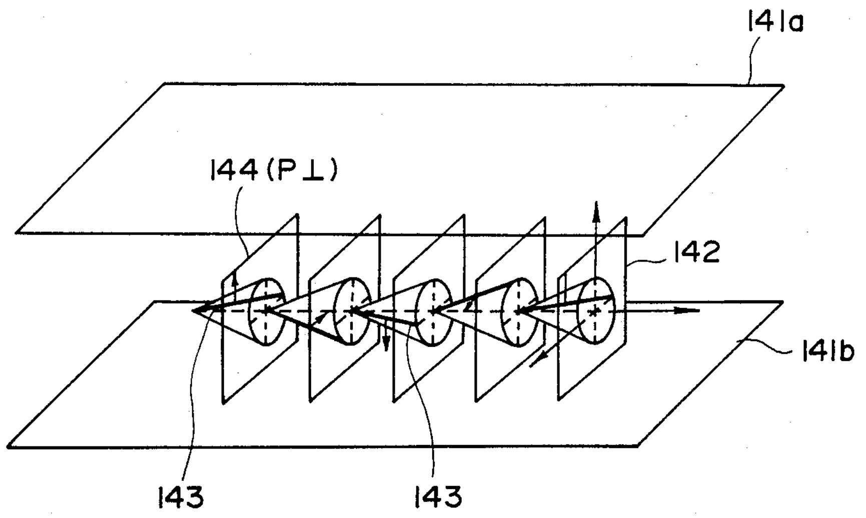
FIGS. 14 and 15 are schematic views each showing a ferroelectric liquid crystal cell.
Figure 15:
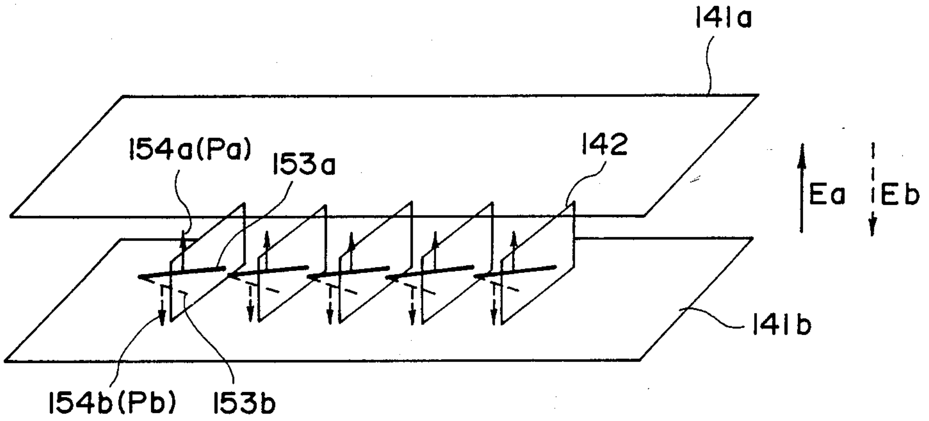
Figure 16:
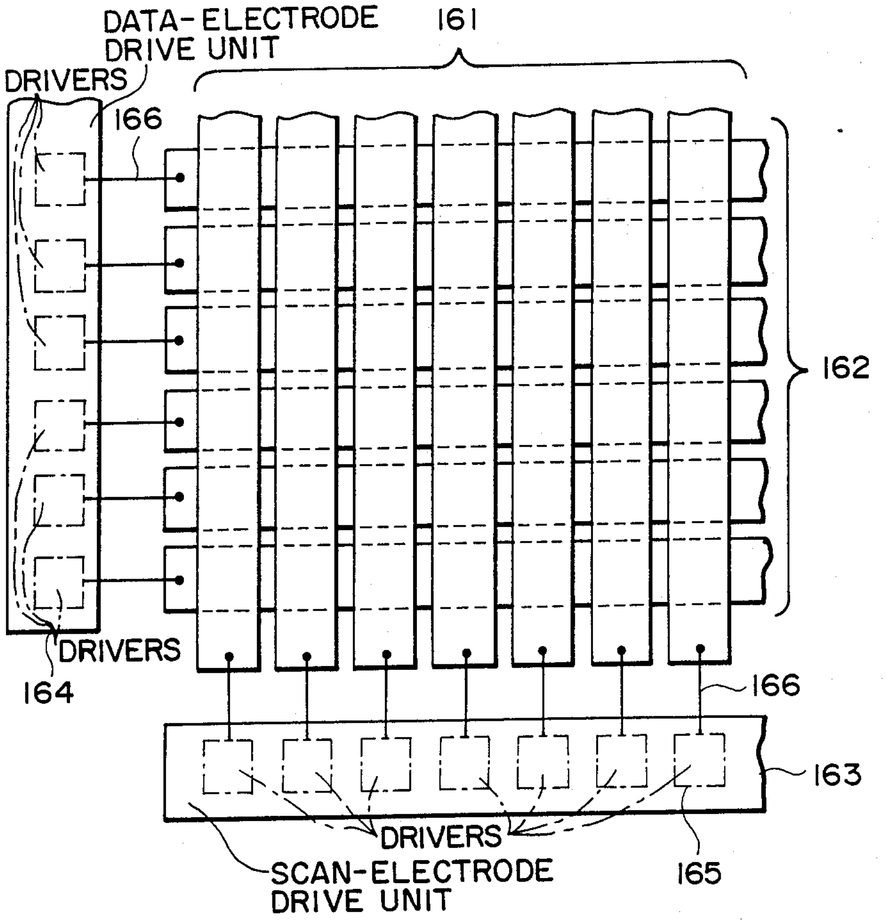
FIG. 16 is a view showing an electrode arrangement of a prior art embodiment.

Referring to FIG. 14, there is schematically shown an example of a ferroelectric liquid crystal cell for explanation of the operation thereof. Reference numerals 141*a* and 141*b* denote substarates (glass plates) on which a transparent electrode of, e.g., $In_2O_3$, $S_nO_2$, ITO (indium-tin-oxide), etc., is disposed, respectively. A liquid crystal of, e.g., an SmC*-phase in which liquid crystal molecular layers 142 are oriented perpendicular to surfaces of the glass plates is hermetically disposed therebetween. Full lines 143 show liquid crystal molecules. Each liquid crystal molecule 143 has a dipole moment (P⊥) 144 in a direction perpendicular to the axis thereof. When a voltage higher than a certain threshold level is applied between electrodes formed on the base plates 141*a* and 141*b*, a helical structure of the liquid crystal molecule 143 is unwound or released to change the alignment direction of respective liquid crystal molecules 143 so that the dipole moments (P⊥) 144 are all directed in the direction of the electric field. The liquid crystal molecules 143 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell (the thickness of the ferroelectric liquid crystal layer) is sufficiently thin (e.g., 1 micron), the helical structure of the liquid crystal molecules is unwound to provide a non-helical structure even in the absence of an electric field whereby the dipole moment assumes either of the two states, i.e., Pa in an upper direction 153*a* or Pb in a lower direction 154*a* as shown in FIG. 15. When electric field Ea or Eb higher than a certain threshold level and different from each other in polarity as shown in FIG. 15 is applied to a cell having the above-mentioned characteristics, the dipole moment is directed either in the upper direction 154*a* or in the lower direction 154*b* depending on the vector of the electric field Ea or Eb. In correspondence with this, the liquid crystal molecules are oriented in either of a first stable state 153*a* (bright state) and a second stable state 153*b* (dark state).

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 15. When the electric field Ea is applied to the liquid crystal molecules, they are oriented to the first stable state 153*a*. This state is stably retained even if the electric field is removed. On the other hand, when the electric field Eb of which direction is opposite to that of the electric field Ea is applied thereto, the liquid crystal molecules are oriented to the second stable state 153*b*, whereby the directions of molecules are changed. This state is also stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 microns, particularly 1 to 5 microns. A liquid crystal-electrooptical device having a matrix electrode structure in which the ferroelectric liquid crystal of this kind is used is proposed, e.g., in the specification of U.S. Pat. No. 4367924 by Clark and Lagerwall.

We is claimed is:

1. A method for driving a display panel comprising a substrate, a conductor film formed on the substrate, a resistor material having a larger resistivity than the conductor film, and a plurality of voltage supply lines electrically connected to the conductor film by the resistor material, the resistor material being disposed between each of the plurality of voltage supply lines and the conductor film, said method comprising the step of:

simultaneously applying voltage signals to two voltage supply lines among the plurality of voltage supply lines so as to cause a first voltage drop through the resistor material, thereby to provide a region of the conductor film disposed between the two voltage supply lines with a substantially uniform voltage having a minimal voltage drop therethrough, wherein the first voltage drop is greater than the minimal voltage drop.

2. A method according to claim 1, wherein the conductor film comprises a transparent conductor film.

3. A method according to claim 1, wherein the voltage supply lines comprise a film of a metal or alloy.

4. A method for driving a display panel comprising a substrate, a plurality of stripe conductor films formed on the substrate, a resistor material having a larger resistivity than the conductor films, and two voltage supply lines disposed along the longitudinal direction of and in electrical connection with each of the stripe conductor films by the resistor material, the resistor material being disposed between each of the two voltage supply lines and the strips conductor films, said method comprising the steps of:

simultaneously applying voltage signals to the two voltage supply lines so as to cause a first voltage drop through the resistor material, thereby to provide a region of each of the conductor films disposed between the two voltage supply lines with a substantially uniform voltage having a minimal voltage drop therethrough, wherein the first voltage drop is greater than the minimal voltage drop.

5. A method according to claim 4, wherein the stripe conductor films comprise a transparent conductor film.

6. An apparatus according to claim 4, wherein said voltage supply lines comprise a film of a metal or alloy.

7. A method according to claim 4, wherein the voltage supply lines are disposed on both lateral sides along the longitudinal direction of one of the strip conductor films.

8. A display apparatus comprising:

a display panel comprising a first substrate having thereon a first conductor film, a plurality of resistors having a larger resistivity than said first conductor film, a plurality of voltage supply lines each electrically connected to said first conductor film respectively through a respective one of said resistors, each of said resistors being disposed between a respective one of said voltage supply lines and said first conductor film, a second substrate having thereon a second conductor film disposed opposite to said first conductor film disposed opposite to said first conductor film, and an optical modulation material disposed between said first and second substrates; and driving means for simultaneously applying voltage signals to two of said plurality of voltage supply lines so as to cause a first voltage drop through the respective resistor, thereby to provide a region of the conductor film disposed between the two voltage supply lines with a substantially uniform voltage having a minimal voltage drop therethrough and for applying a voltage signal to said second conductor film in synchronism with the application of the voltage signals, wherein the first voltage drop is larger than the minimal voltage drop.

9. An apparatus according to claim 8, wherein said first and second conductor films respectively comprise a transparent conductor film.

10. An apparatus according to claim 8, wherein said voltage supply lines comprise a film of a metal or alloy.

11. An apparatus according to claim 8, wherein a scanning signal is applied to said plurality of voltage supply lines, and a data signal is applied to said second conductor film.

12. An apparatus according to claim 8, wherein said optical modulation material comprises a liquid crystal.

13. An apparatus according to claim 12, wherein said liquid crystal comprises a ferroelectric liquid crystal.

14. An apparatus according to claim 8, wherein said resistor comprises a material selected from the group consisting of silicon or selenium.

15. An apparatus according to claim 8, wherein said driving means includes means for applying a plurality of voltage levels to each of said at least two voltage supply lines.

16. An apparatus according to claim 8, wherein said driving means includes means for applying voltages of mutually opposite directions to said two voltage supply lines.

17. A display apparatus comprising:

a display panel comprising a first substrate having thereon a plurality of first stripe conductor films, a resistor material having a larger resistivity than said first conductor films, two voltage supply lines disposed along the longitudinal direction of and in electrical connection with each of said first stripe conductor films respectively by the said resistor material said resistor material being disposed between each of said two voltage supply lines and said first stripe conductor films, a second substrate having thereon second stripe conductor films disposed opposite to said first stripe conductor films, an optical modulation material disposed between the first and second substrates; and driving means for simultaneously applying voltage signals to said two voltage supply lines among said plurality of voltage supply lines so as to cause a first voltage drop through the resistor material, thereby to provide a region of the conductor film disposed between the two voltage supply lines with a substantially uniform voltage having a minimal voltage drop therethrough and for applying a voltage signal to said second stripe conductor films in synchronism with the application of the voltage signals, wherein the first voltage drop is larger than the minimal voltage drop.

18. An apparatus according to claim 17, wherein said first and second conductor films respectively comprise a transparent conductor film.

19. An apparatus according to claim 17, wherein said voltage supply lines comprise a film of a metal or alloy.

20. An apparatus according to claim 17, wherein said voltage supply lines are disposed on both lateral sides along the longitudinal direction one of said first stripe conductor film.

21. An apparatus according to claim 17, wherein said voltage supply lines are connected to a scanning signal drive unit.

22. An apparatus according to claim 17, wherein second stripe conductor films are connected to a data signal drive unit.

23. An apparatus according to claim 17, wherein said optical modulation material comprises a liquid crystal.

24. An apparatus according to claim 23, wherein said liquid crystal comprises a ferroelectric liquid crystal.

25. An apparatus according to claim 17 wherein said driving means includes means for applying voltages of mutually opposite directions to said two voltage supply lines.

26. A display apparatus, comprising:

a display panel comprising a first substrate having thereon a plurality of first conductor films, a resistor material having a larger resistivity than said plurality of first conductor films, and a first and a second voltage supply lines electrically connected to each of said plurality of first conductor films respectively by said resistor material said resistor material being disposed between each of said first and second voltage supply lines and said first conductor films, said plurality of first conductor films being grouped into a plurality of blocks, said first voltage supply lines in each block being commonly connected, said second voltage supply lines in each block being commonly connected, a second substrate having thereon second conductor films disposed opposite to said plurality of first conductor films, and an optical modulation material disposed between the first and second substrates; and driving means comprising a first scanning signal drive unit for applying a first scanning signal to said first voltage supply lines, a second scanning signal drive unit for applying a second scanning signal to said second voltage supply lines, and a data signal drive unit for applying a data signal to said second conductor films.

27. An apparatus according to claim 26, wherein said optical modulation material comprises a liquid crystal.

28. An apparatus according to claim 27, wherein said liquid crystal comprises a ferroelectric liquid crystal.

29. An apparatus according to claim 26, wherein said driving means includes means for applying a plurality of voltage levels to each of said at least two voltage supply lines.

30. An apparatus according to claim 26, wherein said driving means includes means for applying voltages of mutually opposite directions to said two voltage supply lines.

31. A display apparatus, comprising:

a display panel comprising a first substrate having thereon a plurality of first conductor films , a resistor material having a larger resistivity than said first conductor films, first and second voltage supply lines electrically connected to each of said first conductor films respectively by said resistor material, said resistor material being disposed between each of said first and second voltage supply lines and said first conductor films, said first voltage supply line of an adjacent pair of said first conductor films and said second voltage supply line of another of said adjacent pair of said first conductor films being commonly connected, a second substrate having thereon a plurality of seeond conductor films disposed opposite to said first conductor films, and an optical modulation material disposed between said first and second substrates; and driving means comprising a first scanning signal drive unit for applying a first scanning signal to said first voltage supply lines, a second scanning signal drive unit for applying a second scanning signal to said second voltage supply lines, and a data signal drive unit for applying a data signal to said second conductor films.

32. An apparatus according to claim 31, wherein said optical modulation material comprises a liquid crystal.

33. An apparatus according to claim 32, wherein said liquid crystal comprises a ferroelectric liquid crystal.

34. An apparatus according to claim 31, wherein said driving means includes means for applying a plurality of voltage levels to each of said at least two voltage supply lines.

35. An apparatus according to claim 31, wherein said driving means includes means for applying voltages of mutually opposite directions to said two voltage supply lines.

* * * * *